US012677217B2

(12) United States Patent
Deng et al.

(10) Patent No.: US 12,677,217 B2
(45) Date of Patent: Jul. 7, 2026

(54) MULTI-TIME INTERVAL DATA TRANSMISSION METHOD AND APPARATUS, AND USER EQUIPMENT

(71) Applicant: SPREADTRUM COMMUNICATIONS (SHANGHAI) CO., LTD., Shanghai (CN)

(72) Inventors: Yun Deng, Shanghai (CN); Xingya Shen, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 297 days.

(21) Appl. No.: 18/289,667

(22) PCT Filed: May 10, 2022

(86) PCT No.: PCT/CN2022/091866
§ 371 (c)(1),
(2) Date: Nov. 6, 2023

(87) PCT Pub. No.: WO2022/237751
PCT Pub. Date: Nov. 17, 2022

(65) Prior Publication Data
US 2024/0244526 A1 Jul. 18, 2024

(30) Foreign Application Priority Data
May 11, 2021 (CN) .......................... 202110512665.0

(51) Int. Cl.
*H04W 52/02* (2009.01)

(52) U.S. Cl.
CPC ... *H04W 52/0216* (2013.01); *H04W 52/0248* (2013.01); *H04W 52/0274* (2013.01)

(58) Field of Classification Search
None
See application file for complete search history.

(56) References Cited

U.S. PATENT DOCUMENTS

| | | | | |
|---|---|---|---|---|
| 2014/0112127 A1* | 4/2014 | Jayaram | ................ | H04W 24/08 370/252 |
| 2015/0282103 A1* | 10/2015 | Immonen | ............ | H04W 52/367 370/329 |

(Continued)

FOREIGN PATENT DOCUMENTS

| | | |
|---|---|---|
| CN | 101835172 A | 9/2010 |
| EP | 1229664 A1 | 8/2002 |
| WO | 2013116400 A1 | 8/2013 |

OTHER PUBLICATIONS

International Search Report for International Application No. PCT/CN2022/091866; Mailing Date, Jul. 6, 2022.

*Primary Examiner* — Benjamin Lamont
(74) *Attorney, Agent, or Firm* — CANTOR COLBURN LLP

(57) ABSTRACT
A multi-time interval data transmission method and apparatus, and a user equipment are provided. The multi-time interval data transmission method includes: receiving transmission parameters for multi-time interval transmission, wherein the transmission parameters are used to determine transmission power and transmission occasions, and the transmission occasions include a plurality of transmission time intervals; determining, in each of the plurality of transmission time intervals, a difference between current transmission power and initial transmission power, and a relative relationship between the difference and a first preset threshold; and determining whether to perform data transmission in a current transmission time interval and/or subsequent transmission time intervals at least based on the relative relationship.

7 Claims, 2 Drawing Sheets

(56)         References Cited

U.S. PATENT DOCUMENTS

2019/0289628 A1     9/2019  Xiong et al.
2020/0359330 A1*  11/2020  Zacharias  ........... H04W 52/367
2022/0030523 A1*   1/2022  Wang  ................. H04W 52/243
2023/0247560 A1*   8/2023  Zhang  ................ H04W 52/365

* cited by examiner

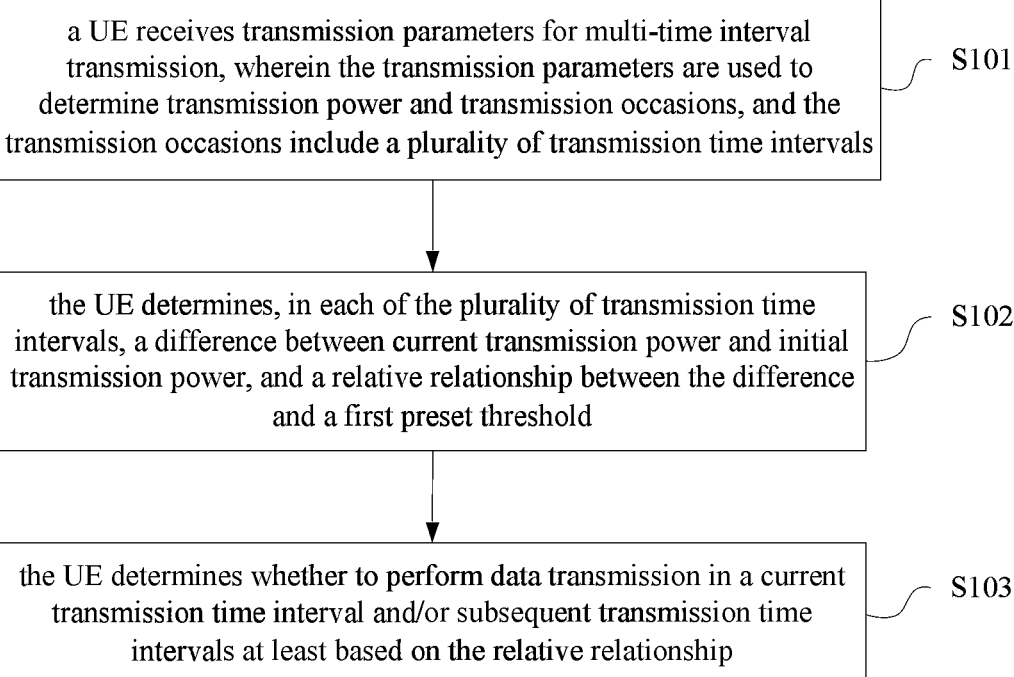

a UE receives transmission parameters for multi-time interval transmission, wherein the transmission parameters are used to determine transmission power and transmission occasions, and the transmission occasions include a plurality of transmission time intervals    S101 the UE determines, in each of the plurality of transmission time intervals, a difference between current transmission power and initial transmission power, and a relative relationship between the difference and a first preset threshold    S102 the UE determines whether to perform data transmission in a current transmission time interval and/or subsequent transmission time intervals at least based on the relative relationship    S103

FIG. 1

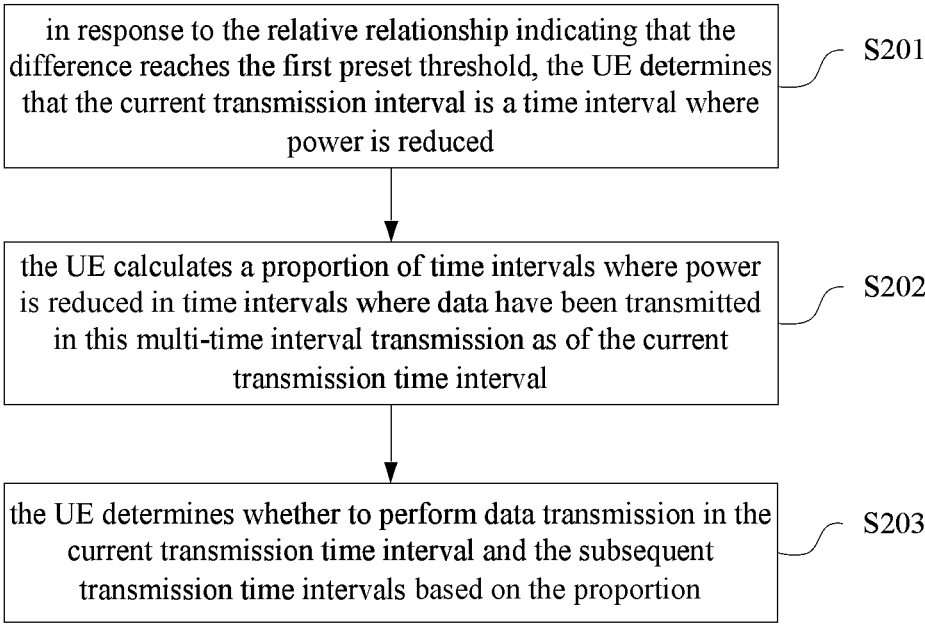

in response to the relative relationship indicating that the difference reaches the first preset threshold, the UE determines that the current transmission interval is a time interval where power is reduced — S201 the UE calculates a proportion of time intervals where power is reduced in time intervals where data have been transmitted in this multi-time interval transmission as of the current transmission time interval — S202 the UE determines whether to perform data transmission in the current transmission time interval and the subsequent transmission time intervals based on the proportion — S203

FIG. 2

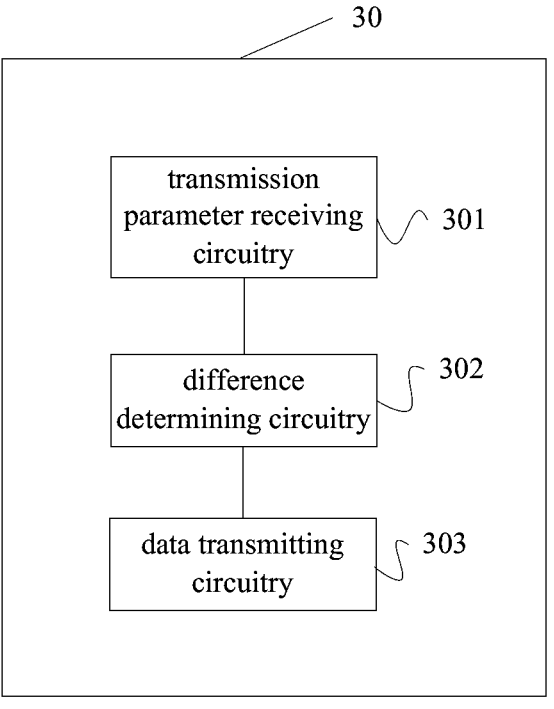

30 transmission parameter receiving circuitry — 301 difference determining circuitry — 302 data transmitting circuitry — 303

FIG. 3

MULTI-TIME INTERVAL DATA TRANSMISSION METHOD AND APPARATUS, AND USER EQUIPMENT

CROSS-REFERENCE TO RELATED APPLICATIONS

This is the U.S. national stage of application No. PCT/CN2022/091866, filed on May 10, 2022. Priority under 35 U.S.C. § 119(a) and 35 U.S.C. § 365(b) is claimed from Chinese Application No. 202110512665.0, filed May 11, 2021, the disclosure of which is also incorporated herein by reference.

TECHNICAL FIELD

The present disclosure generally relates to communication technology field, and more particularly, to a multi-time interval data transmission method and apparatus, and a User Equipment (UE).

BACKGROUND

In New Radio (NR) technology, usually a UE transmits a Transmission Block (TB) to a base station in a slot according to scheduling of the base station.

Recently, NR has considered introducing a new data transmission mechanism, tentatively designated as a TB over multiple slot (TBoMS) method, that is, one TB is transmitted through multiple slots. The base station needs to receive signals from the UE in multiple slots to completely parse data transmitted by the UE. This solution is mainly to improve coverage and allow the UE to use this mechanism to reliably transmit data at an edge of cells.

SUMMARY

Embodiments of the present disclosure may avoid an issue on data transmission efficiency caused by unstable transmission power in a multi-time interval transmission scenario.

In an embodiment of the present disclosure, a multi-time interval data transmission method is provided, including: receiving transmission parameters for multi-time interval transmission, wherein the transmission parameters are used to determine transmission power and transmission occasions, and the transmission occasions include a plurality of transmission time intervals; determining, in each of the plurality of transmission time intervals, a difference between current transmission power and initial transmission power, and a relative relationship between the difference and a first preset threshold; and determining whether to perform data transmission in a current transmission time interval and/or subsequent transmission time intervals at least based on the relative relationship.

In an embodiment of the present disclosure, a computer-readable storage medium having computer instructions stored therein is provided, where when the computer instructions are executed by a processor, the above multi-time interval data transmission method is performed.

In an embodiment of the present disclosure, a UE which includes a memory, and a processor is provided, where the memory has computer instructions stored therein, and when the processor executes the computer instructions, the above multi-time interval data transmission method is performed.

BRIEF DESCRIPTION OF THE DRAWINGS

FIG. 1 is a flow chart of a multi-time interval data transmission method according to an embodiment:

FIG. 2 is a flow chart of S103 as shown in FIG. 1 according to an embodiment; and FIG. 3 is a block diagram of a multi-time interval data transmission apparatus according to an embodiment.

DETAILED DESCRIPTION

As described in the background, the existing TBoMS method requires the UE to maintain power stability and phase continuity: However, during the actual transmission process, the UE may not be able to maintain the stability of the transmission power due to some reasons. In this case, how the UE needs to handle the TBoMS becomes an urgent issue to be solved.

In embodiments of the present disclosure, TBoMS is represented by transmitting a TB at multiple time intervals. The time interval may be in units of slot or a duration of partial symbols in the slot. The time intervals may be continuous in time or discontinuous in time. For the sake of simplicity, transmitting a TB at multiple time intervals is simply called multi-time interval transmission. A serving base station of a UE may configure the UE to perform one or more multi-time interval transmissions. Each multi-time interval transmission can transmit a same data block (i.e., retransmission) or transmit different data blocks (i.e., new transmission). Transmission through TBoMS refers to transmission on a physical uplink shared channel. For a physical layer, transmitted content is data, while for higher layers, the transmitted content may be data or high-layer signaling. This is collectively referred to as data transmission via multi-time intervals.

In the embodiments of the present disclosure, when determining to perform multi-time interval transmission, a UE may determine, in each transmission time interval, a difference between current transmission power and an initial transmission power, and a relative relationship between the difference and a first preset threshold, and determine whether to perform data transmission in a current transmission time interval and/or subsequent transmission time intervals at least based on the relative relationship. That is, the UE can determine whether data sent with the current transmission power can be successfully parsed by a base station through the difference between the current transmission power and the initial transmission power, thereby determining whether to continue data transmission in the current transmission time interval and the subsequent transmission time intervals. When there is a large change between the current transmission power and the initial transmission power, data transmission may be cancelled to reduce unnecessary transmission and power consumption of the UE, and to mitigate interference to a network.

The technical solutions of the present disclosure can be applied to 5G, 4G or 3G communication systems, and various new communication systems in the future, such as 6G and 7G communication systems.

In order to clarify the objects, characteristics and advantages of the disclosure, embodiments of present disclosure will be described in detail in conjunction with accompanying drawings.

Referring to FIG. 1, FIG. 1 is a flow chart of a multi-time interval data transmission method according to an embodiment.

The multi-time interval data transmission method may be applied to a UE side, that is, a UE may perform steps of the method.

Specifically, the multi-time interval data transmission method may include S101, S102 and S103.

In S101, a UE receives transmission parameters for multi-time interval transmission, wherein the transmission parameters are used to determine transmission power and transmission occasions, and the transmission occasions include a plurality of transmission time intervals.

A serving base station may transmit transmission parameters for multi-time interval transmission to the UE in one piece of signaling or multiple pieces of signaling which may be RRC signaling and/or physical layer downlink control signaling.

In S102, the UE determines, in each of the plurality of transmission time intervals, a difference between current transmission power and initial transmission power, and a relative relationship between the difference and a first preset threshold.

In some embodiments, the first preset threshold may be preset by a protocol or may be configured by the base station to the UE. The initial transmission power refers to transmission power for data transmission in the first time interval determined by the UE based on the transmission parameters in this multi-time interval transmission. Determining the transmission power based on the transmission parameters is an existing technology, and is not described herein, which may be referred to TS38.213.

In some embodiments, each transmission time interval may be transmission time intervals except the first time interval in this multi-time interval transmission or may also include the first time interval. In this case, the UE determines the transmission power based on the transmission parameters. Before transmission, if the transmission power in the first time interval needs to be reduced due to other reasons such as Maximum Permissible Exposure (MPE) restrictions, the UE may determine the difference in power based on a difference between actual transmission power and the transmission power determined by the UE based on the transmission parameters (that is, the initial transmission power).

In S103, the UE determines whether to perform data transmission in a current transmission time interval and/or subsequent transmission time intervals at least based on the relative relationship.

It should be noted that sequence numbers of steps in the embodiment do not limit an execution order of the step.

It could be understood that, in some embodiments, the multi-time interval data transmission method may be implemented in a form of a software program which runs in a processor integrated within a chip or a chip module. Alternatively, the method may be implemented using a combination of software and hardware, which is not limited in the embodiments.

Embodiments of the present disclosure are applied to scenarios where the transmission power of the UE changes during multi-time interval data transmission, mainly in scenarios where the transmission power of the UE decreases.

The term "transmission time interval" in the embodiments refers to a basic time unit of dynamic or semi-static scheduling resources of the serving base station. Specifically, it may be a slot, a half slot, or a duration of several symbols.

The term "multi-time interval data transmission" in the embodiments means that one TB is transmitted via multiple time intervals.

In following descriptions, the transmission time interval is a slot. In this case, multi-time interval data transmission is TBoMS. In the embodiment, the UE accesses a serving cell, establishes a Radio Resource Control (RRC) connection, and carries out services. As the UE moves, the UE gradually moves to an edge of the cell. A condition of a channel where the UE is located is not good, thus, the serving base station configures the UE to use the TBoMS mechanism, that is, one TB is transmitted via a plurality of slots. The plurality of slots is continuous or discontinuous. Locations of transmission resources in the slots may be the same or different.

When the base station configures the UE to use multi-time interval transmission, it may also configure the transmission parameters of the multi-time interval transmission which may include the transmission power and transmission occasions used for the multi-time interval transmission. For example, the serving base station configures the UE to transmit one TB via 8 slots, and the transmission power to be power 1.

In some embodiments, in S101, the UE receives the transmission parameters of multi-time interval transmission. Specifically, when receiving scheduling instruction for uplink transmission through the TBoMS mechanism, the UE transmits according to the determined transmission occasions and transmission power. For example, the UE needs to transmit one TB in a total of 8 slots from slot 1 to slot 8.

In some embodiments, factors such as MPE may cause the UE to be unable to maintain the initial transmission power. MPE means that when the UE is close to a human body, the UE needs to prevent large electromagnetic radiation from being generated on the human body, and to reduce the transmission power. If the UE reduces the transmission power, it is likely that even if the base station receives for the plurality of transmission time intervals completely, such as receiving signals uploaded by the UE in the above 8 slots, the base station may not be able to parse data transmitted by the UE.

To avoid such a situation, in some embodiments, in S102 and S103, the UE may determine the difference between the current transmission power and the initial transmission power in each transmission time interval, and the relative relationship between the difference and the first preset threshold and determine whether to perform data transmission in the current transmission time interval and/or the subsequent transmission time intervals at least based on the relative relationship.

In some embodiments, the difference between the current transmission power and the initial transmission power is an absolute value of reduction amount of the current transmission power compared with the initial transmission power or an absolute value of a power change. Based on a relative size of the difference, i.e., relative to the first preset threshold, it is determined to continue or cancel the data transmission. Data transmission in the current transmission time interval and/or the subsequent transmission time intervals may refer to data transmission in the current transmission time interval, or data transmission in the current transmission time interval and the subsequent transmission time intervals.

Specifically, the difference may be calculated by subtracting the current transmission power (the transmission power in the subsequent time intervals in this multi-time interval transmission) from the initial transmission power (the transmission power in the first time interval in this multi-time interval transmission) and is greater than or equal to 0.

It should be noted that the first preset threshold may be configured by the base station to the UE when configuring multi-time interval transmission, for example, transmitted to the UE through RRC signaling. Alternatively, the first preset threshold may be configured by a communication standard. The first preset threshold may be a value greater than or equal to 0. When the first preset threshold is 0, in each transmission time interval of this multi-time interval transmission, once finding that the transmission power has changed (usually reduced) from the initial transmission power, the UE determines that the transmission power in the time interval is reduced.

In the embodiments of the present disclosure, the UE can determine whether data sent with the current transmission power can be successfully parsed by a base station through the difference between the current transmission power and the initial transmission power, thereby determining whether to continue data transmission in the current transmission time interval and the subsequent transmission time intervals. When there is a large change between the current transmission power and the initial transmission power, data transmission may be cancelled to reduce unnecessary transmission and power consumption of the UE, and to mitigate interference to a network.

In some embodiments, if the relative relationship indicates that the difference is lower than the first preset threshold, data transmission is performed in the current transmission time interval.

In some embodiments, each transmission time interval corresponds to a difference. The difference value may be used to determine the transmission of data within the transmission time interval, or to determine the transmission of data in a time interval following the transmission time interval.

In some embodiments, when the difference is lower than the first preset threshold, it means that reduction of the current transmission power relative to the initial transmission power is small, and the data sent with the current transmission power can be successfully parsed by the base station. Accordingly, data transmission can be continued within the current transmission time interval.

In some embodiments, if the relative relationship indicates that the difference reaches the first preset threshold, data transmission in the current transmission time interval is canceled, or data transmission in the current transmission time interval and the subsequent transmission time intervals is canceled.

In the embodiment, when the difference reaches the first preset threshold, it means that the current transmission power has decreased significantly compared with the initial transmission power, and data sent with the current transmission power cannot be successfully parsed by the base station. Therefore, data transmission in the current transmission time interval and/or the subsequent transmission time intervals is cancelled to reduce power consumption of the UE.

It should be noted that in subsequent steps, data retransmission and other operations may be performed to complete transmission of the data. This process is not described in detail in the embodiments of the present disclosure.

Alternatively, in response to the relative relationship indicating that the difference is higher than the first preset threshold, it is determined whether the difference reaches a second preset threshold: and in response to the difference reaching the second preset threshold, it is determined to cancel data transmission in the current transmission time interval, or cancel data transmission in the current transmission time interval and the subsequent transmission time intervals, where the second preset threshold is greater than the first preset threshold.

Compared with using the same threshold in the foregoing embodiments, in the embodiments, the first preset threshold and the second preset threshold are used for comparison with the difference to achieve flexibility in multi-time interval data transmission.

In some embodiments, in response to the difference being higher than the first preset threshold and lower than the second preset threshold, that is, the difference being between the first preset threshold and the second preset threshold, the UE may determine independently whether to perform data transmission within the current transmission time interval and/or the subsequent transmission time intervals.

In a specific application scenario, the base station configures the UE to transmit one TB in a total of 8 slots from slot 1 to slot 8. After performing uplink transmission in slot 1 and slot 2, the UE finds that the initial transmission power could not be maintained for data transmission. The base station may configure a power change threshold (i.e., the first preset threshold). If the UE needs to reduce the transmission power in subsequent slots, such as slot 3, and a range of power reduction relative to the initial transmission power in TBoMS is lower than the threshold, that is, a change value of transmission power reduction by the UE is lower than the threshold, the UE continues the TBoMS transmission to transmits signals in the subsequent slots in sequence. The base station receives the signals transmitted by the UE in 8 slots and can correctly parse the uplink data. The UE may determine whether the power change value is equal to or exceeds the threshold in each slot, and then perform corresponding actions.

In another specific application scenario, the base station may configure another power change threshold (i.e., the second preset threshold). If the UE finds that the power change value that needs to be reduced in subsequent slots is equal to or exceeds the threshold, the UE stops the data transmission in this slot, or the UE stops the data transmission in this slot and subsequent slots. The UE may determine whether the power change value is equal to or exceeds the threshold in each slot, and then perform corresponding actions.

In some embodiments, referring to FIG. 2, S103 as shown in FIG. 1 may include S201, S202 and S203.

In S201, in response to the relative relationship indicating that the difference reaches the first preset threshold, the UE determines that the current transmission interval is a time interval where power is reduced.

The first preset threshold may be a value greater than or equal to 0.

In S202, the UE calculates a proportion of time intervals where power is reduced in time intervals for data transmission in this multi-time interval transmission as of the current transmission time interval.

In S203, the UE determines whether to perform data transmission in the current transmission time interval and the subsequent transmission time intervals based on the proportion.

In some embodiments, during calculation of the proportion, a total number of time intervals of this multi-time interval transmission may be used as a denominator, or a number of time intervals where data have been transmitted data up to the current transmission time interval may be used as the denominator. For example, the base station configures the UE to transmit a TB in a total of 8 slots from slot 1 to slot 8. The UE finds that power decreases from slot 3 to slot 6. In this case, the denominator may be 8 or 6.

Further, S203 may include in response to the proportion reaching a preset value, determining to cancel data transmission in the current transmission time interval and the subsequent transmission time intervals: in response to the proportion being smaller than the preset value, determining to continue data transmission in the current transmission time interval or to continue data transmission in the current transmission time interval and the subsequent transmission time intervals.

Compared with the foregoing embodiments in which data transmission is determined based on the difference corresponding to each transmission time interval, in the embodiment, data transmission is determined based on the proportion of time intervals where power is reduced in the time intervals where data have been transmitted.

In the embodiments of the present disclosure, the UE may determine the time intervals where power is reduced based on the first preset threshold. For example, in response to the difference between the current transmission power in the current transmission time interval and the initial transmission power, i.e., the reduction amount, being lower than the first preset threshold, the UE determines that the current transmission time interval is not a time interval where power is reduced. In response to the power reduction value being equal to or exceeding the first preset threshold, the UE counts the transmission time interval as a time interval where power is reduced.

Alternatively, the time interval where power is reduced may be determined based on the second preset threshold. For example, in response to the power reduction amount in a slot being lower than the second preset threshold, the UE may not take the power change in the slot as power reduction. Only in response to the power reduction being equal to or exceeding the second preset threshold, the UE takes the power change in the slot as power reduction.

In some embodiments, in response to the proportion of the time intervals where power is reduced reaching a preset proportion, that is, a large proportion of transmission signals corresponding to the transmission power lower than the initial transmission power, the base station cannot restore the signal well and cannot parse the uplink data smoothly. If the UE continues transmission, it may only increase power consumption of the UE. Therefore, the UE may cancel data transmission to reduce unnecessary data transmission and reduce power consumption.

In a specific application scenario, the base station configures the UE to transmit one TB in a total of 8 slots from slot 1 to slot 8. The UE uses the TBoMS mechanism from slot 1 to slot 8. The UE finds that the number of slots with reduced power or no transmission occupies a certain proportion of the total slots for transmission of the TB. For example, TBoMS is originally determined to be transmitted in 8 slots. Currently, it has been found that 4 slots reduce the transmission power or do not have transmission due to MPE, which reaches a preset proportion of 50%, and thus the UE stops transmission in remaining slots. For example, the UE finds that power reduction has occurred in slots 3 to 6, and then cancels transmission in slots 7 and 8.

In some embodiments, in response to receiving a reallocated transmission resource, the UE reports power indication information at least based on the relative relationship to indicate information of transmission power reduction.

In this embodiment, the UE may report information of transmission power reduction to the base station, so that the base station can reasonably schedule subsequent uplink transmission resources. For example, the base station may reduce a number of allocated resources to adapt to the reduction in transmission power.

In some embodiments, if the actual transmission power of the UE continues to decrease due to MPE, the UE may report power indication information to the base station in response to determining that the difference reaches the first preset threshold. The base station reduces the required transmission power by reducing the number of resources allocated to the UE to match the current transmission power of the UE and improve data transmission efficiency.

Referring to FIG. 3, FIG. 3 is a block diagram of a multi-time interval data transmission apparatus 30) according to an embodiment. The multi-time interval data transmission apparatus 30 includes: a transmission parameter receiving circuitry 301 configured to receive transmission parameters for multi-time interval transmission, wherein the transmission parameters are used to determine transmission power and transmission occasions, and the transmission occasions include a plurality of transmission time intervals; a difference determining circuitry 302 configured to determine, in each of the plurality of transmission time intervals, a difference between current transmission power and initial transmission power, and a relative relationship between the difference and a first preset threshold: and a data transmitting circuitry 303 configured to determine whether to perform data transmission in a current transmission time interval and/or subsequent transmission time intervals at least based on the relative relationship.

In the embodiments of the present disclosure, whether the data transmitted with the current transmission power can be successfully parsed by the base station can be determined based on the change of the current transmission power compared with the initial transmission power, thereby determining whether to continue data transmission in the current transmission time interval and/or the subsequent transmission time intervals. Embodiments of the present disclosure can take into account power consumption of the UE and avoid unnecessary transmission while ensuring transmission efficiency in a scenario where the transmission power of multi-time interval transmission is unstable.

In some embodiments, the above multi-time interval data transmission apparatus may correspond to a chip with a multi-time interval data transmission function in a UE, such as a System-On-Chip (SOC) or a baseband chip, or to a chip module including a chip with a multi-time interval data transmission function in the UE, or to a chip module including a chip with a data processing function, or to the UE.

More details of working principles and working modes of the multi-time interval data transmission apparatus 30 can be referred to related descriptions in FIG. 1 and FIG. 2 and are not repeated here.

Each module/unit of each apparatus and product described in the above embodiments may be a software module/unit or a hardware module/unit or may be a software module/unit in part, and a hardware module/unit in part. For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

In an embodiment of the present disclosure, a storage medium having computer instructions stored therein is provided, where when the computer instructions are executed, the above method in FIG. 1 or FIG. 2 is performed. In some embodiments, the storage medium may include a ROM, a RAM, a magnetic disk, or a compact disc, or include a non-volatile or a non-transitory memory.

In an embodiment of the present disclosure, a UE including a memory and a processor is provided, where the memory has computer instructions stored therein, and when the processor executes the computer instructions, the above method in FIG. 1 or FIG. 2 is performed. The UE may include but not limited to a mobile phone, a computer, or a tablet computer.

The technical solutions of the present disclosure are also applicable to different network architectures, including but not limited to a relay network architecture, a dual-link network architecture, or a Vehicle-to-Everything (V2X) communication architecture.

The base station in the embodiments of the present disclosure may also be referred to as a base station equipment, and is a device deployed in a Radio Access Network (RAN) to provide radio communication functions. For example, an equipment that provides a base station function in a 2G network includes a Base Transceiver Station (BTS). An equipment that provides the base station function in a 3G network includes a Node B. An equipment that provides the base station function in a 4G network includes an evolved node B (eNB). In a Wireless Local Area Network (WLAN), an equipment that provides the base station function is an Access Point (AP). An equipment that provides the base station function in a 5G New Radio (NR) includes gNB and a continuously evolved Node B (ng-eNB), where gNB and the terminal use NR technology for communication, ng-eNB and the terminal use Evolved Universal Terrestrial Radio Access (E-UTRA) technology for communication, and both gNB and ng-eNB can be connected to a 5G core network. And the base station also refers to an equipment that provides the base station function in a new communication system in the future.

The network in the embodiments of the present disclosure refers to a communication network that provides communication services for terminals, including a base station of a radio access network, a base station controller of a radio access network, and a device on a core network side.

The terminal in the embodiments of the present disclosure may refer to various forms of UE, access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

The descriptions of the first, second, etc. in the embodiments of the present disclosure are merely for illustrating and differentiating the objects, and do not represent the order or the particular limitation of the number of devices in the embodiments of the present disclosure, which do not constitute any limitation to the embodiments of the present disclosure.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor, or the processor may be any conventional processor or the like.

The above embodiments may be implemented in whole or in part by software, hardware, firmware, or any combination thereof. When implemented in software, the above embodiments may be implemented in whole or in part in the form of a computer program product. The computer program product includes one or more computer instructions or computer programs. The procedures or functions according to the embodiments of the present disclosure are wholly or partially generated when the computer instructions or the computer programs are loaded or executed on a computer. The computer may be a general-purpose computer, a special purpose computer, a computer network, or other programmable device. The computer instructions may be stored in a computer readable storage medium or transmitted from one computer readable storage medium to another computer readable storage medium, for example, the computer instructions may be transmitted from one website, computer, server or data center to another website, computer, server, or data center by wired or wireless means.

It should be understood that, in the various embodiments of the present disclosure, sequence numbers of the above-mentioned processes do not represent an execution sequence, and the execution sequence of each process should be determined by its function and inherent logic, which does not limit an implementation process of the embodiments of the present disclosure.

In the above embodiments of the present disclosure, it should be understood that the disclosed method, device, and system may be implemented in other ways. For example, the above device embodiments are merely illustrative, and for example, division of units is merely one logical division, and other divisions may be realized in practice, for example, a plurality of units or components may be combined or integrated into another system, or some features may be omitted, or not executed. Further, the shown or discussed mutual coupling or direct coupling or communication connection may be an indirect coupling or communication connection via some interfaces, devices, or units, and may be in an electrical, mechanical or other form.

The units described as separate parts may or may not be physically separate, and parts shown as units may or may not be physical units, that is, may be disposed in one place, or may be distributed on a plurality of network units. Some or all of the units can be selected according to practical requirements to achieve the purpose of the solutions of the embodiments.

In addition, functional units in the embodiments of the present disclosure may be integrated in one processing unit, or each unit may be physically separate, or two or more units may be integrated in one unit. The integrated units can be realized in a form of hardware, or in a form of hardware plus a software functional unit.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A multi-time interval data transmission method, comprising:

receiving transmission parameters for multi-time interval transmission, wherein the transmission parameters are used to determine transmission power and transmission occasions, and the transmission occasions comprise a plurality of transmission time intervals;

determining, in each of the plurality of transmission time intervals, a difference between current transmission power and initial transmission power, and a relative relationship between the difference and a first preset threshold; and determining whether to perform data transmission in a current transmission time interval and/or subsequent transmission time intervals at least based on the relative relationship;

wherein said determining whether to perform data transmission in the current transmission time interval and/or the subsequent transmission time intervals at least based on the relative relationship comprises:

in response to the relative relationship indicating that the difference is higher than the first preset threshold, determining whether the difference reaches a second preset threshold; and in response to the difference reaching the second preset threshold, determining to cancel data transmission in the current transmission time interval, or cancel data transmission in the current transmission time interval and the subsequent transmission time intervals, wherein the second preset threshold is greater than the first preset threshold; or wherein said determining whether to perform data transmission in the current transmission time interval and/or the subsequent transmission time intervals at least based on the relative relationship comprises:

in response to the relative relationship indicating that the difference reaches the first preset threshold, determining that the current transmission interval is a time interval where power is reduced;

calculating a proportion of time intervals where power is reduced in time intervals for data transmission in this multi-time interval transmission as of the current transmission time interval; and determining whether to perform data transmission in the current transmission time interval and the subsequent transmission time intervals based on the proportion.

2. The method according to claim 1, wherein said determining whether to perform data transmission in the current transmission time interval and the subsequent transmission time intervals based on the proportion comprises:

in response to the proportion reaching a preset value, determining to cancel data transmission in the current transmission time interval and the subsequent transmission time intervals; and in response to the proportion being smaller than the preset value, determining to continue data transmission in the current transmission time interval.

3. The method according to claim 1, further comprising:

in response to receiving a reallocated transmission resource, reporting power indication information at least based on the relative relationship to indicate information of transmission power reduction.

4. A non-transitory computer-readable storage medium storing one or more programs, the one or more programs comprising computer instructions, which, when executed by a processor, cause the processor to:

receive transmission parameters for multi-time interval transmission, wherein the transmission parameters are used to determine transmission power and transmission occasions, and the transmission occasions comprise a plurality of transmission time intervals;

determine, in each of the plurality of transmission time intervals, a difference between current transmission power and initial transmission power, and a relative relationship between the difference and a first preset threshold; and determine whether to perform data transmission in a current transmission time interval and/or subsequent transmission time intervals at least based on the relative relationship;

wherein the processor is further caused to:

in response to the relative relationship indicating that the difference is higher than the first preset threshold, determine whether the difference reaches a second preset threshold; and in response to the difference reaching the second preset threshold, determine to cancel data transmission in the current transmission time interval, or cancel data transmission in the current transmission time interval and the subsequent transmission time intervals, wherein the second preset threshold is greater than the first preset threshold; or wherein the processor is further caused to:

in response to the relative relationship indicating that the difference reaches the first preset threshold, determine that the current transmission interval is a time interval where power is reduced;

calculate a proportion of time intervals where power is reduced in time intervals for data transmission in this multi-time interval transmission as of the current transmission time interval; and determine whether to perform data transmission in the current transmission time interval and the subsequent transmission time intervals based on the proportion.

5. A User Equipment (UE), comprising a memory and a processor, wherein the memory stores one or more programs, the one or more programs comprising computer instructions, which, when executed by the processor, cause the processor to:

receive transmission parameters for multi-time interval transmission, wherein the transmission parameters are used to determine transmission power and transmission occasions, and the transmission occasions comprise a plurality of transmission time intervals;

determine, in each of the plurality of transmission time intervals, a difference between current transmission power and initial transmission power, and a relative relationship between the difference and a first preset threshold; and determine whether to perform data transmission in a current transmission time interval and/or subsequent transmission time intervals at least based on the relative relationship;

wherein the processor is further caused to:

in response to the relative relationship indicating that the difference is higher than the first preset threshold, determine whether the difference reaches a second preset threshold; and in response to the difference reaching the second preset threshold, determine to cancel data transmission in the current transmission time interval, or cancel data transmission in the current transmission time interval and the subsequent transmission time intervals, wherein the second preset threshold is greater than the first preset threshold; or wherein the processor is further caused to:

in response to the relative relationship indicating that the difference reaches the first preset threshold, determine that the current transmission interval is a time interval where power is reduced;

calculate a proportion of time intervals where power is reduced in time intervals for data transmission in this multi-time interval transmission as of the current transmission time interval; and determine whether to perform data transmission in the current transmission time interval and the subsequent transmission time intervals based on the proportion.

6. The UE according to claim 5, wherein the processor is further caused to:

in response to the proportion reaching a preset value, determine to cancel data transmission in the current transmission time interval and the subsequent transmission time intervals; and in response to the proportion being smaller than the preset value, determine to continue data transmission in the current transmission time interval.

7. The UE according to claim 5, wherein the processor is further caused to:

in response to receiving a reallocated transmission resource, report power indication information at least based on the relative relationship to indicate information of transmission power reduction.

* * * * *